United States Patent Office 3,088,823
Patented May 7, 1963

3,088,823
SEPARATION OF URANIUM METAL FROM OXIDES AND SLAG IN THE REDUCTION OF URANIUM TETRAFLUORIDE
Orville R. Magoteaux, Cincinnati, Ohio, assignor to the United States of America as represented by the United States Atomic Energy Commission
No Drawing. Filed June 26, 1961, Ser. No. 119,747
4 Claims. (Cl. 75—84.1)

My invention relates to the preparation of uranium metal and more particularly to separation of uranium metal from oxides and reaction-product slag in the reduction of uranium tetrafluoride.

Uranium metal is currently produced by reducing $UF_4$ with an alkaline earth metal such as magnesium or calcium. Although a less efficient reductant than calcium, magnesium is employed for large-scale production because of its lower cost. In a typical production operation, $UF_4$ is blended with magnesium granules or chips and the resulting mixture is placed in a refractory-lined reduction bomb. The bomb is sealed and heated in a resistance or induction furnace until the reduction mixture reacts, producing uranium metal and magnesium fluoride slag in an exothermic reaction. The more dense uranium metal separates by gravity from the slag and collects as a regulus, or derby, at the bottom of the reactor. The uranium derby is then removed from the reactor, and adhering slag is removed by mechanical chipping or, if necessary, by means of further treatment such as nitric acid pickling or roasting in air, followed by a rapid quench. The treated uranium derby is melted under vacuum to remove impurities and to improve the quality of the metal and is cast into ingots which may be further fabricated into nuclear reactor fuel element cores by conventional techniques such as forging or rolling. Further details of this process may be seen by reference to "Uranium Production Technology" by C. D. Herrington and A. E. Ruehle (1959), at pages 245 through 269.

One of the problems continually encountered in this process is incomplete separation of the product uranium derby from reaction product slag and oxides. Magnesium fluoride slag adheres as a layer on the uranium derby, requiring removal as described above. While adhering slag may be removed by these treatments, the uranium yield is decreased. Further difficulty is presented by the presence of uranium oxides. Uranium oxides in the $UF_4$-magnesium reaction mixture, being more dense than magnesium fluoride slag, settle and intermingle with the upper surface of the uranium derby, forming an extremely rough upper layer. Some of the oxides may be removed in the same manner as magnesium fluoride slag, but the uranium yield is further decreased and a portion of the oxides are carried into the vaccum melting step, resulting in both decreased yield and lower metal quality in this step. For these reasons the maximum permissible uranium oxide content in $UF_4$ employed for metal production has been 3 weight percent, and less than 2 weight percent has been preferred. Uranium oxides in $UF_4$ are commonly referred to as the AOI (ammonium oxalate insoluble) content since $UF_4$ normally contains some quantity of a mixture of various insoluble uranium oxides which is determined analytically by ammonium oxalate dissolution.

In the normal operation of a large-scale $UF_4$ production facility, $UF_4$ with an oxide content higher than permissible, e.g., as high as 10 weight percent, is produced from time to time because of variations in uranium oxide feed reactivity, failure of process equipment and other reasons. Blending of such material with $UF_4$ having an oxide content well below specification or reprocessing has been required in order to avoid the production of low-quality metal. It may be readily seen that a considerable amount of extra processing equipment and labor consumption are required for handling this material.

It is, therefore, an object of my invention to provide a method of separating uranium metal from oxides and slag in the reduction of $UF_4$.

Another object is to provide a method of preparing high-quality uranium metal from $UF_4$ having an oxide content of over 3 weight percent.

Another object is to provide a method of increasing the uranium yield and quality in the reduction of $UF_4$ with magnesium.

Other objects and advantages of my invention will be apparent from the following detailed description and claims appended hereto.

In accordance with my invention uranium metal is separated from oxides and slag in the reduction of $UF_4$ with magnesium by providing a minor proportion of metallic lead in the $UF_4$-magnesium reaction mixture. Even for $UF_4$ with a high oxide content, the resulting uranium derby has a smooth surface without oxide or slag inclusions. The uranium yield is increased both in the reduction step and in subsequent vacuum melting, and the product metal is of sufficient purity and quality for fabrication into nuclear reactor fuel cores. Substantially all of the lead which is introduced into the uranium derby in this process is readily removed by vacuum melting and casting.

I have found that lead is interposed as a layer between the heavier uranium metal and the lighter oxides and slag upon solidification of the reaction products. Intimate contact and intermingling of the uranium metal and oxides during cooling of the reaction mass is thus prevented.

Other metals and alloys with physical properties similar to the properties of lead may also be employed to enhance slag-metal separation. Properties required for this application are a density between the densities of uranium metal and magnesium fluoride, a melting point below 3000° F. and an appreciable vapor pressure at the melting point of magnesium fluoride. Metals such as silver, bismuth, mercury, tin and their alloys and lead alloys may be employed. However, because of its greater effectiveness, lower cost, ease of separation from the product uranium metal and, in the case of preparing uranium metal for nuclear reactor use, low thermal neutron cross section, lead is highly preferred over these metals and alloys.

A proportion of lead equivalent to at least 0.2 weight percent of the uranium in the reaction mixture is required for enhanced separation, and approximately 0.4 weight percent is preferred. The maximum amount of lead employed is not critical, but lead substantially in excess of the preferred amount offers no further advantage and may result in an unduly high lead content in the product uranium.

Lead may be provided to the $UF_4$-magnesium reaction mixture in the form of small pieces, or preferably as lead shot dispersed throughout the mixture. The physical form or placement of the lead is not critical.

The conditions under which the reduction reaction is carried out are not critical to my invention, and any of the previously known techniques may be used. In a preferred embodiment finely divided $UF_4$ and 4 percent excess magnesium in the form of granules or chips, together with the lead additive as lead shot are thoroughly blended and the resulting mixture is placed in a magnesium-fluoride or graphite lined reactor. The reactor is then closed and placed in a resistance or induction furnace and heated at an elevated temperature, e.g., 1250° F., until the mixture ignites. After being allowed to cool, the reactor is opened and the resulting uranium derby is recovered. The derby readily breaks loose from an adhering layer of lead, which separates the uranium from oxides and slag.

The uranium metal thus produced may contain an appreciable amount, e.g., 0.5 weight percent, of lead. Substantially all of the lead is removed in the previously known vacuum melting and casting step which is routinely used to remove impurities such as magnesium and hydrogen. In this treatment the metal derby is placed in a crucible, and the crucible is heated in an evacuated furnace until the uranium melts and bubbling of the melt ceases. This treatment serves to volatilize the lead.

My invention is not limited to a particular apparatus, and any of the previously employed reactor materials of construction may be employed. It is also to be understood that the lead additive may be used in combination with other measures previously employed to obtain maximum uranium yield, such as the use of a 4 percent excess of magnesium, and the use of $UF_4$ with optimum physical properties, e.g., a bulk density of 4 grams per cubic centimeter and particle size of −20 U.S. standard mesh.

My invention is further illustrated by the following specific examples.

EXAMPLE I

A series of 12 $UF_4$ reduction experiments was conducted in order to determine the effect of lead on the separation of uranium from oxides and slag. In each experiment 39.38 pounds of $UF_4$ and 6.34 pounds magnesium (4 percent excess) were blended and placed in a reduction bomb reactor 18 inches high, 6 inches in diameter at the top and 5.75 inches in diameter at the bottom. The reactor was provided with a .75 inch thick magnesium-fluoride liner. Except for four control experiment, varying amounts of lead were provided in the reaction mixture in the form of shot (−6 U.S. standard mesh) or pieces approximately ½ inch in diameter. The $UF_4$ employed in each case was of low quality, containing 92.9 weight percent $UF_4$, 2.45 weight percent uranyl fluoride and 4.64 weight percent ammonium oxalate insoluble material (uranium oxides). In each experiment the reactor was placed in a resistance or induction furnace controlled to a temperature of 1250° F. Upon being heated for varying periods the mixture reacted, producing a metal derby 6 inches in diameter, about 1.8 inches thick and weighing (at 100 percent yield) 29.85 pounds. After being allowed to cool, the reactor was opened and the resulting uranium derby was recovered. The actual yield in each case was determined from the total amount of uranium in the reaction mixture. Further details and results obtained may be seen by reference to the following table.

*Table I*

USE OF LEAD IN REDUCTION OF $UF_4$

| Experiment No. | Lead Added (wt. percent of uranium as $UF_4$) | Heating Time (minutes) | Derby Class [1] | Amount of Lead in Derby (wt. percent) | Yield (percent) | Type of Lead and Place in Charge |
|---|---|---|---|---|---|---|
| 1 | 6.6 | 99 | 1 | 0.54 | 97.0 | pieces, in bottom of charge. |
| 2 | 2.0 | 113 | 1 | 0.31 | 99.2 | shot, blended in charge. |
| 3 | 0.8 | 120 | 1 | ---------- | 100.0 | shot, 1 inch from bottom. |
| 4 | 0.8 | 131 | 1 | 0.16 | 99.0 | pieces, ⅔ from bottom. |
| 5 | 0.8 | 115 | 1 | 0.10 | 98.4 | pieces at center. |
| 6 | 0.4 | 119 | 1 | 0.18 | 99.3 | pieces, ⅔ from bottom. |
| 7 | 0.2 | 126 | 1 | 0.07 | 98.4 | Do. |
| 8 | 0.1 | 125 | 3 | ---------- | 101.8 | pieces at center. |
| 9 | none | 123 | 3 | ---------- | 94.8 | |
| 10 | none | 128 | 3 | ---------- | 96.6 | |
| 11 | none | 125 | 1 | ---------- | 93.8 | |
| 12 | none | 129 | 1 | ---------- | 91.1 | |

[1] Derby class refers to the physical condition of the derby, including the relative differences in surface roughness and oxide and slag inclusions. Class 1 derbies are smooth and suitable for routine melting. Class 2 derbies are rough and contain appreciable amounts of slag and oxides (about 1 percent). Class 3 derbies are extremely rough and contain large amounts of slag and oxides (2.5 percent or more).

It may be seen from the above table that uranium metal quality is substantially improved by the addition of lead, high-quality derbies being produced in each experiment where more than 0.1 percent lead was added. The oxide-containing $UF_4$ used in these experiments frequently may result in poor-quality derbies where a lesser amount or no lead is used, as evidenced by experiments 8, 9 and 10, wherein class 3 derbies were obtained. The uranium derby yield was increased from an average of 94.1 percent without lead to 99.1 percent with the lead additive.

EXAMPLE II

Six of the derbies prepared as described in Example I were subjected to vacuum melting in order to determine if the lead in the derbies and other impurities could be removed in the procedure normally employed in uranium production. One-half of each derby was placed in a graphite crucible 3½ inches inner diameter by 5 inches deep. The crucibles had previously been flame-sprayed with magnesium zirconate to provide a coating. The six crucibles were placed inside one large crucible which was evacuated and heated at a temperature of 2550° F. until the uranium ceased bubbling (7 minutes). A vacuum pressure of 490 microns of mercury was employed. The crude derbies and the resulting ingots were analyzed for lead and various other impurities. The results obtained may be seen by reference to the following table.

*Table II*
VACUUM REMELTING OF URANIUM DERBIES

| Analyses | Derby from Experiment No.— | | | | | | | | | | | |
|---|---|---|---|---|---|---|---|---|---|---|---|---|
| | 1 | | 2 | | 4 | | 5 | | 6 | | 7 | |
| | Before remelting | After remelting | Before | After | Before | After | Before | After | Before | After | Before | After |
| Lead (weight percent) | 0.54 | 0.027 | 0.34 | .022 | 0.16 | 0.007 | 0.15 | 0.018 | 0.20 | 0.008 | 0.07 | 0.015 |
| Nitrogen (parts per million) | 374 | 54 | 448 | 60 | 505 | 26 | 43 | 23 | 568 | 38 | 39 | 63 |
| Hydrogen (parts per million) | 5.0 | 1.39 | 2.67 | 1.3 | 6.14 | 1.16 | 2.78 | 1.1 | 2.86 | 0.75 | 2.39 | 0.80 |
| Density (grams per cubic centimeter) | 18.89 | 18.89 | 18.89 | 18.78 | 18.25 | 18.81 | 18.71 | 18.99 | 18.94 | 18.82 | 18.73 | 18.82 |
| Magnesium (parts per million) | >100 | <4 | >100 | <4 | >100 | 6 | >100 | >100 | >100 | 6 | >100 | <4 |

It may be seen from the above table that the lead impurity introduced into the uranium derbies in the reduction step is reduced to an extremely low level by vacuum remelting. Removal of other impurities such as hydrogen and magnesium and the density obtained is essentially the same for this uranium as for uranium reduced without the presence of lead.

It is to be understood that the above examples are merely illustrative and are not to be construed as limiting in any manner the scope of my invention, which is limited only as indicated by the appended claims.

Having thus described my invention, I claim:

1. The process of preparing uranium metal from $UF_4$ containing approximately 3 to 10 weight percent uranium oxides which comprises mixing said oxide-containing $UF_4$ with magnesium in excess of the stoichiometric amount required to reduce said $UF_4$, providing lead in the resulting mixture at a proportion of at least approximately 0.2 weight percent of the uranium values in said mixture, heating the resulting lead-containing mixture until said mixture reacts whereby uranium metal and slag are formed, recovering the resulting lead-containing uranium metal and heating said lead-containing uranium metal under vacuum whereby said lead is substantially completely removed.

2. The process of claim 1 wherein lead is provided in said reaction mixture at a proportion of approximately 0.4 weight percent of the uranium values in said mixture.

3. The process of preparing uranium metal from $UF_4$ containing uranium oxides at a proportion up to 10 weight percent which comprises mixing said oxide-containing $UF_4$ with magnesium in excess of the stoichiometric amount required to reduce said $UF_4$, providing metallic lead in the resulting mixture at a proportion of at least approximately 0.2 weight percent of the uranium values in said mixture, heating the resulting lead-containing mixture until said mixture reacts whereby uranium metal and slag are formed, and recovering the resulting uranium metal.

4. The process of claim 3 wherein lead is provided in said mixture at a proportion of approximately 0.4 weight percent of the uranium values in said mixture.

References Cited in the file of this patent
UNITED STATES PATENTS 2,787,538    Spedding _____ Apr. 2, 1957
2,960,398    Leaders et al. _____ Nov. 15, 1960

OTHER REFERENCES

"Uranium Production Technology" by C. D. Herrington and A. E. Ruele (1959), pp. 245–269.